(12) United States Patent
Wilkinson et al.

(10) Patent No.: US 10,311,498 B2
(45) Date of Patent: Jun. 4, 2019

(54) METHOD AND SYSTEM FOR RECOMMENDING A SIZE OF A WEARABLE ITEM

(71) Applicant: Amazon Technologies, Inc., Seattle, WA (US)

(72) Inventors: Matthew Tyler Wilkinson, Pittsburgh, PA (US); Nicholas B. End, Pittsburgh, PA (US); Grant B. Fresen, Pittsburgh, PA (US); Erich Wolodzko, Stanford, CA (US)

( * ) Notice: Subject to any disclaimer, the term of this patent is extended or adjusted under 35 U.S.C. 154(b) by 1216 days.

(21) Appl. No.: 14/561,765

(22) Filed: Dec. 5, 2014

(65) Prior Publication Data

US 2015/0161707 A1    Jun. 11, 2015

Related U.S. Application Data

(60) Provisional application No. 61/912,610, filed on Dec. 6, 2013.

(51) Int. Cl.
    *G06Q 30/06* (2012.01)
(52) U.S. Cl.
    CPC ................ *G06Q 30/0631* (2013.01)
(58) Field of Classification Search
    CPC ........... G06Q 30/0621; G06Q 30/0643; G06Q 30/0623; G06Q 30/0641; G06Q 30/0631; G06Q 30/02; G06Q 30/0601; G06Q 30/0603
    See application file for complete search history.

(56) References Cited

U.S. PATENT DOCUMENTS

| 6,192,593 B1 | 2/2001 | Borchers et al. |
| 6,665,577 B2 | 12/2003 | Onyshkevych et al. |
| 6,741,728 B1 | 5/2004 | Genest |
| 6,879,945 B1 | 4/2005 | Cook |
| 8,478,663 B2 | 7/2013 | Lu et al. |
| 8,521,616 B2 | 8/2013 | End et al. |

(Continued)

OTHER PUBLICATIONS

X. Zhu, J. Huang and Y. Qi, "An Apparel Recommender System Based on Data Mining," 2010 International Conference on Web Information Systems and Mining, Sanya, 2010, pp. 48-52. URL: http://ieeexplore.ieee.org/stamp/stamp.jsp?tp=&arnumber=5662281&isnumber=5662245 (Year: 2010).*

*Primary Examiner* — Kathleen Palavecino
*Assistant Examiner* — Lance Y Cai
(74) *Attorney, Agent, or Firm* — Lee & Hayes, P.C.

(57) ABSTRACT

A method and system for recommending a size of a wearable item uses a data set of wearable items, in which the data for each wearable item comprises a size and, for each size, one or more additional parameters related to the fit or feel of the item. A processing device receives a selection of one of the wearable items and a size for the selected wearable item from a user, accesses the data set to analyze the one or more additional parameters for the selected item in the selected size, and prompts the user to provide personalized sizing information. Based upon the personalized sizing information, which can include primary and secondary sizing information, the processing device provides a recommended size in the wearable item for the user. Additionally, the processing device can determine if the wearable item runs true to a standard size and, if not, adjust the recommended size accordingly.

16 Claims, 8 Drawing Sheets

(56) References Cited

U.S. PATENT DOCUMENTS

| | | |
|---|---|---|
| 8,762,292 B2 | 6/2014 | Bright et al. |
| 2002/0023087 A1 | 2/2002 | Vickery et al. |
| 2003/0069807 A1 | 4/2003 | Lyden |
| 2007/0198120 A1* | 8/2007 | Wannier .............. A41H 3/007 700/138 |
| 2009/0287452 A1 | 11/2009 | Stanley et al. |
| 2011/0295711 A1* | 12/2011 | Mazmanyan .......... G06Q 30/02 705/26.7 |
| 2012/0030060 A1 | 2/2012 | Lu et al. |
| 2012/0316827 A1 | 12/2012 | Wilkinson et al. |
| 2012/0316985 A1 | 12/2012 | Wilkinson et al. |
| 2014/0032369 A1 | 1/2014 | End et al. |

* cited by examiner

METHOD AND SYSTEM FOR RECOMMENDING A SIZE OF A WEARABLE ITEM

CROSS REFERENCE TO RELATED PATENT PUBLICATIONS

This patent document claims priority to U.S. Provisional Patent Application No. 61/912,610 titled "Method and System for Recommending a Size of a Wearable Item," filed Dec. 6, 2013. The full content of the priority document is incorporated into this document by reference.

BACKGROUND

This disclosure relates to providing a user with sizing information. More specifically, the present disclosure relates to providing a user with sizing information related to a user-selected wearable item.

Finding the correct apparel size to purchase online is difficult due to the inability to try on the apparel. A user must select a size the user thinks will fit, and can only try the apparel on after the apparel is delivered to the user. However, sizes may vary among various manufacturers, which may cause a user to select an incorrect size. Situations like this lead to a high number of apparel returns, increasing shipping costs for the retailer, the consumer, or both. Many people choose not to purchase apparel online at all due to the risk of not being satisfied with a purchase and having to return the item.

One example of size varying greatly among manufacturers is in footwear. Many choose not to shop for footwear online because they cannot physically try on the footwear and do not want the inconvenience of returning improperly fitting footwear. Furthermore, those who do shop online typically purchase the same footwear and size of which they are familiar, thus limiting the selection potential.

Finding the ideal fit for footwear is also problematic because of the potential for lack in consistency in sizing among footwear manufacturers. For example, a size 10 shoe or boot from one footwear manufacturer may have different internal dimensions from a size 10 shoe or boot from another footwear manufacturer. Internal dimensions may even differ between models offered by a single manufacturer. Manufacturers continually change and discontinue models, so there is typically a need for fitting even if the user has found a good fit in a given shoe model.

These sizing problems are not unique to footwear. Additional types of wearable items also vary in size between manufacturers. Varying sizes can be found in nearly all types of wearable items and apparel, including, but not limited to, outerwear, clothing, underwear, lingerie, hats, gloves, glasses and sunglasses, helmets, and other similar wearable items. For example, a women's size 8 dress as designed and manufactured by company X can have different internal measurements when compared to a women's size 8 dress as designed and manufactured by company Y. Due to such sizing differences, a person who typically wears a size 8 by company X might be more comfortable in a size 10 by company Y. However, typical online retailers do not provide a level of sizing information that enables a consumer to be aware of these differences prior to purchasing.

SUMMARY

In one general respect, the embodiments disclose a computer-implemented method of recommending sizes for wearable items. For example, a computer-implemented method of recommending a particular size of a wearable item may include maintaining, in a data storage facility, a data set comprising data regarding wearable items, in which the data for each wearable item includes a size and, for each size, additional parameters such as internal measurements of the item, consumer ratings, or return data. An electronic device may generate and output a user interface by which a user may select a wearable item from the data set. The user interface of the electronic device may receive a user selection of one of the wearable items and a size for the selected wearable item. A processor may access the data set to retrieve additional parameters for the selected item in the selected size, access parameters for a reference size having a value that matches that of the selected size, and determine whether the selected item in the selected size runs true to fit by comparing the additional parameters for the selected item in the selected size to the parameters for the reference size. Upon determining that the selected item in the selected size does not run true to fit, the processor may generate a message informing the user that the selected size does not run true to fit and cause the electronic device to output the message to the user. After determining that the selected item in the selected size does not run true to fit, the processor may identifying an alternate size for the selected item, generate a recommendation that the user select the alternate size of the selected item, and cause the electronic device to output the recommendation to the user.

Optionally, when the parameters for each wearable item comprise internal measurement information for the item, the user interface of the electronic device may prompt the user to enter personal fit information comprising a primary size and a secondary size, and it may receive the personal fit information via the user interface. The processor may use the personal fit information, internal measurement information for the selected size of the selected wearable item, and internal measurement information for at least one alternative size of the selected wearable item to determine a recommended alternate size for the wearable item. The processor may then cause the electronic device to present the recommended size to the user.

Optionally, when the additional parameters comprise return data or consumer rating data, when identifying the alternate size for the selected wearable item the system may consider whether the return data or consumer rating data indicates that a potential size of the selected wearable item does not run true to fit. If so, it may only select the potential size as the alternate size if it does not conclude that the return data or consumer rating data indicates that the potential size of the selected wearable item does not run true to fit.

In an alternate embodiment, a system recommends sizes for wearable items by maintaining, in a data storage facility, a data set comprising data regarding a plurality of wearable items. The data for each wearable item comprises a size and, for each size, one or more additional parameters. The additional parameters for each size of the selected wearable item comprise internal measurement data. The system may receive, from a user via a user interface, a selection of one of the wearable items and a size for the selected wearable item. The system may then access the data set to analyze the one or more additional parameters for the selected item in the selected size, and it may use the analyzed one or more additional parameters to determine that the selected item in the selected size does not run true to a standard size. The system also may receive a primary typical size and a secondary typical size from the user, and it may use the primary typical size, the secondary typical size, the internal measurement data for the selected size of the selected wearable item, and internal measurement data for at least one alternative size of the selected wearable item to determine a recommended size for the wearable item. It may then cause a user interface to output the recommended size to the user.

Optionally, the one or more additional parameters also may include return data or consumer rating data. If so, then when determining the recommended size for the selected wearable item the system may consider whether the return data or consumer rating data indicates that a potential size of the selected wearable item does not run true to fit, and only select the potential size as the recommended size if the considering does not conclude that the return data or consumer rating data indicates that the potential size of the selected wearable item does not run true to fit.

Optionally, to determine that the selected item in the selected size does not run true to size, the system may compare the parameters associated with the selected item in the selected size against a set of parameters associated with a standard size that corresponds to the selected size, and it may determine that a difference between the parameters of the selected item in the selected size and the parameters of the standard size exceeds a threshold amount. Alternatively, determining the difference may include determining that at least a threshold number of the parameters of the selected item in the selected size exceed the corresponding parameters of the standard size by the threshold amount. As another alternative, determining the difference may include determining that a composite function of the parameters of the selected item in the selected size exceeds a composite function of the corresponding parameters of the standard size by the threshold amount. In any option, the standard size may comprise an overall average for all item models in a particular size.

Optionally, when using the primary typical size, the secondary typical size, the internal measurement data for the selected size of the selected wearable item, and internal measurement data for at least one alternative size of the selected wearable item to determine a recommended size for the wearable item, the system may use the primary typical size and the secondary typical size to determine a plurality of personal dimension values for a body part of the user, wherein the body part is that on which the selected wearable item is designed to be worn. The system also may identify the size of the wearable item that has internal dimension values that most closely fit the determined personal dimension values of the user; and it may develop a recommendation comprising the identified size of the wearable item.

Any or all of the steps described above may be implemented by a computing device having a processor that executes programming instructions stored on a non-transitory computer-readable medium. The programming instructions may be configured to cause the processor to implement the relevant steps.

DETAILED DESCRIPTION

As used in this document, the singular forms "a," "an," and "the" include plural references unless the context clearly dictates otherwise. Unless defined otherwise, all technical and scientific terms used herein have the same meanings as commonly understood by one of ordinary skill in the art. As used in this document, the term "comprising" means "including, but not limited to."

As used herein, "wearable item" or "apparel" refers to any item or collection of items that are designed, sized and/or configured to be worn by a person. Examples of wearable items or apparel include footwear, outerwear (including, but not limited to coats, jackets, ponchos, capes, robes, cloaks, gloves, and other related outerwear), clothing (including, but not limited to, socks, pants, shorts, skirts, dresses, shirts, gowns, sweaters, hosiery, suits, underwear, lingerie, saris, wraps, swimsuits, neckwear, belts, and other related clothing), headgear (including, but not limited to, hats, helmets, glasses, sunglasses, goggles, earmuffs, scarves, and other related headgear), sporting accessories (including, but not limited to, pads, shin-guards, mouthpieces, protective sleeves, sports-specific gloves, and other related sporting accessories) and other related wearable items.

"Footwear" refers to any type of apparel that may be worn on a person's lower body, specifically the feet and optionally also the lower legs. Examples include athletic shoes and other shoes, work boots, ski boots and other boots, sandals, slippers, and any other apparel item designed to be worn on the foot and optionally also the lower leg.

"Apparel model" refers to a specific type of apparel offered by a manufacturer, typically having a name, model and item number or code. For example, a footwear model refers to a specific type of footwear offered by a manufacturer.

"Apparel representation" refers to a computer-readable representation of an apparel model stored in a computer readable medium. An apparel representation may be a two dimensional or three dimensional (3D) representation. For example, a footwear representation may be a 3D representation of a specific footwear model.

A "computing device" or "electronic device" refers to a device that includes a processor and non-transitory, computer-readable memory. The memory may contain programming instructions that, when executed by the processor, cause the computing device to perform one or more operations according to the programming instructions. Examples of computing devices include personal computers, servers, mainframes, gaming systems, televisions, and portable electronic devices such as smartphones, personal digital assistants, cameras, tablet computers, laptop computers, media players and the like. Example components of an electronic device are disclosed below in the discussion relating to FIG. 9.

The terms "memory," "computer-readable medium," data storage facility" and "data store" each refer to a non-transitory device on which computer-readable data, programming instructions or both are stored. Unless the context specifically states that a single device is required or that multiple devices are required, the terms "memory," "computer-readable medium" and "data store" include both the singular and plural embodiments, as well as portions of such devices such as memory sectors.

A "processor" is a hardware component of an electronic device that executes programming instructions. The term "processor" may refer to either a single processor or to multiple processors that together implement various steps of a process. Unless the context specifically states that a single processor is required or that multiple processors are required, the term "processor" includes both the singular and plural embodiments.

The term "user interface" refers to one or more hardware components of an electronic device with which a human user may interact. The user interface may include functions by which the device receives information from a user, outputs information to the user, or both. Examples include a display, touch-screen, keyboard, mouse, touch-sensitive pad, keyboard, speaker, microphone and other interface devices. In addition to the hardware components, a user interface may include programming instructions that, when executed by a processor, cause the hardware components to perform one or more functions, or that interpret various commands received from a user via the hardware components.

As discussed above, various problems exist in attempting to match a user to a specific model of apparel based upon user measurements and manufacturers' data. The present disclosure relates to various methods and systems for determining and providing sizing information to a user for a specific apparel item in response to a user selection of the apparel item from a retailer, for example, an online retailer.

Figure 1:
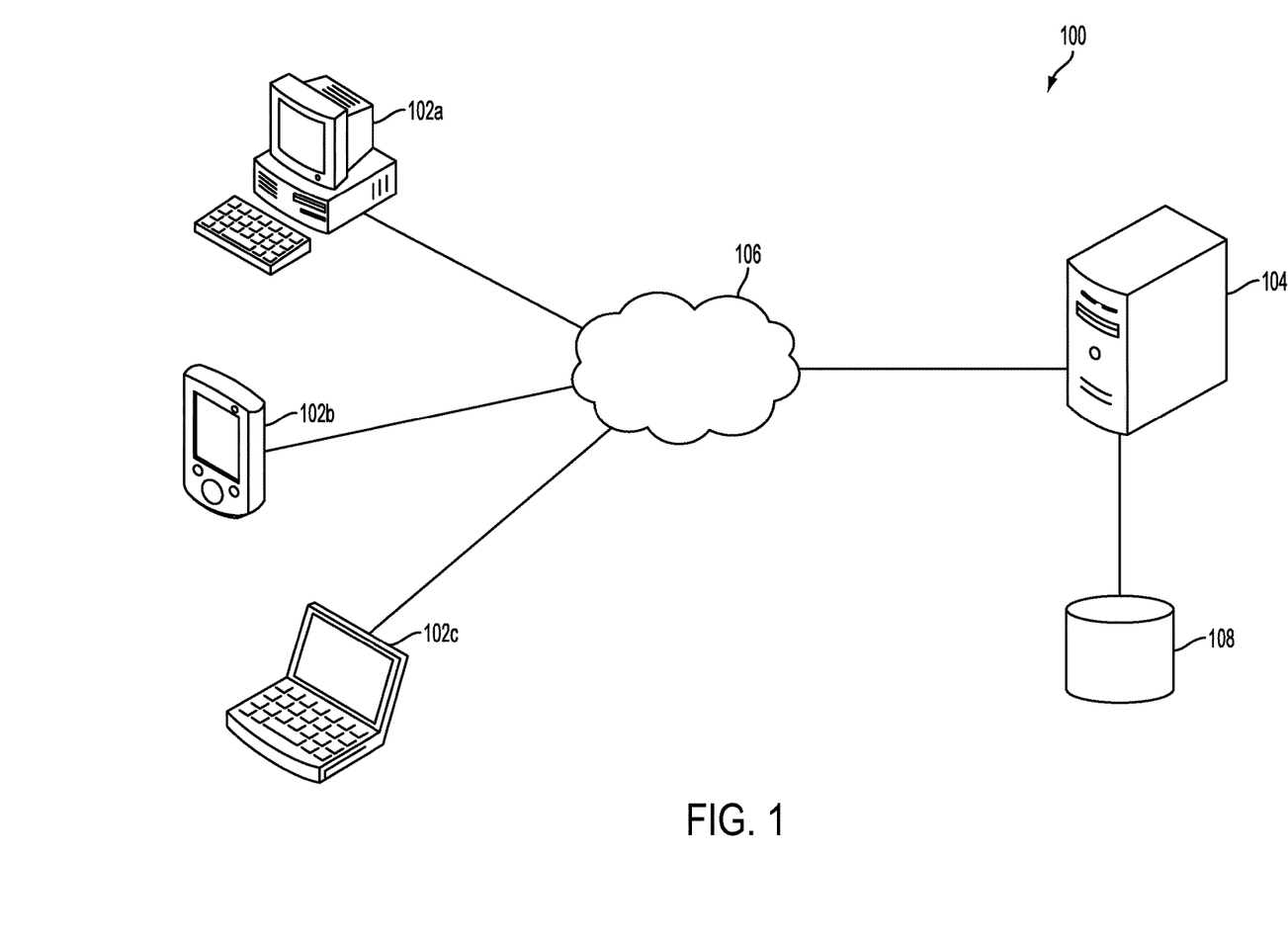
FIG. 1 illustrates an example of a computer network according to an embodiment.
Figure 6A:
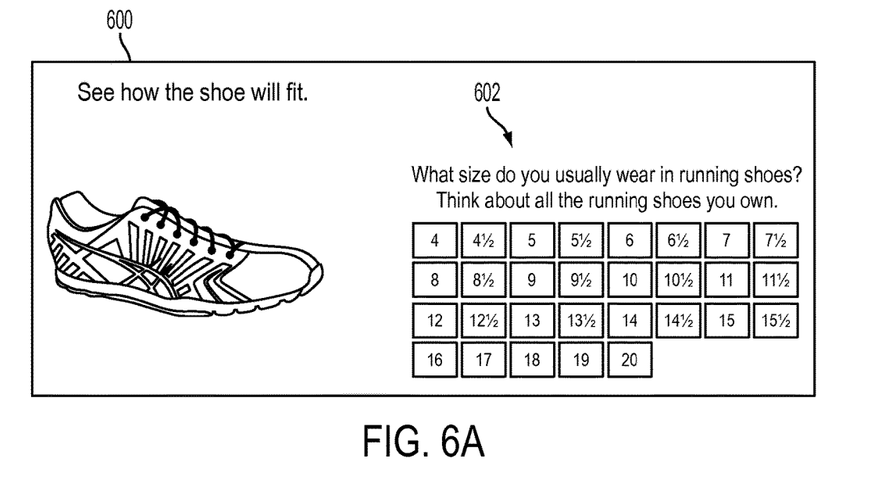
FIG. 6A illustrates a sample element of a user interface for receiving primary sizing information according to an embodiment.
Figure 6B:
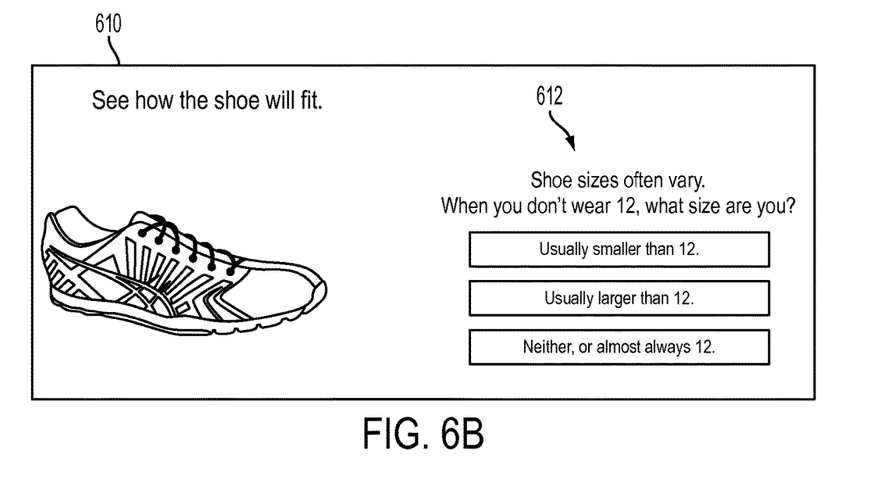
FIG. 6B illustrates a sample element of a user interface for receiving secondary sizing information according to an embodiment.
Figure 7:
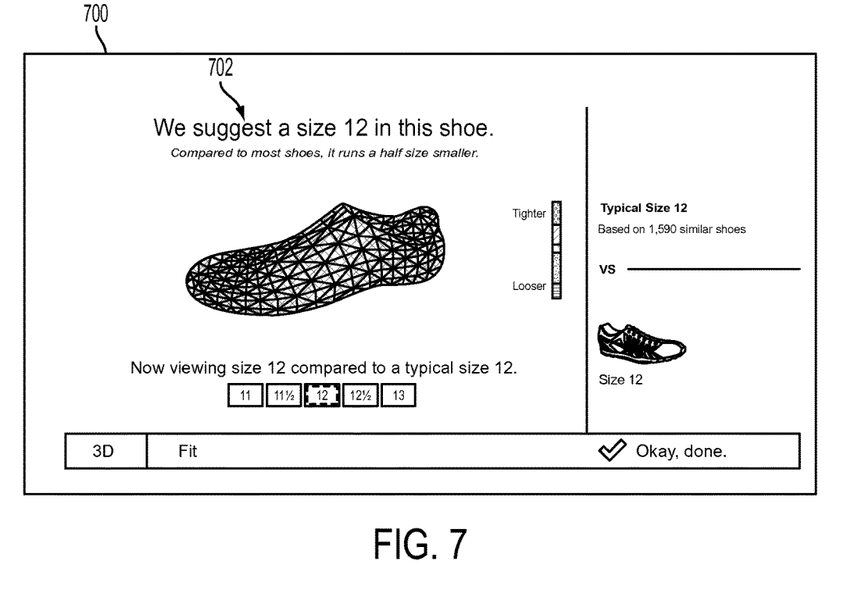
FIG. 7 illustrates a sample user interface element showing a size recommendation according to an embodiment.
Figure 8:
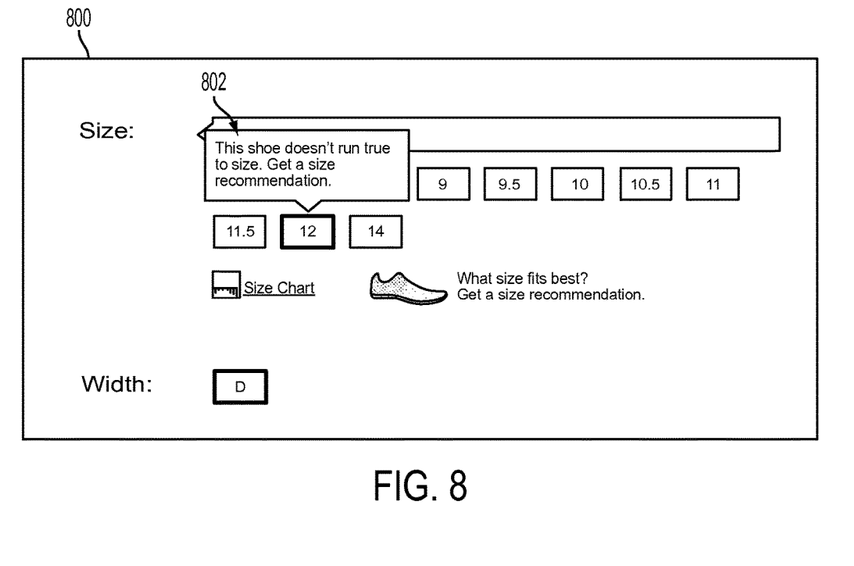
FIG. 8 illustrates a sample user interface element that informs a user that a selected item does not run true to size according to an embodiment.

FIG. 1 illustrates an example of a communications network 100 according to an embodiment. The network 100 may include various user computing devices such as desktop computer 102*a*, portable device 102*b* (including, but not limited to smart phones, personal digital assistants, tablet computing devices, or other portable devices capable of establishing a communications link), and laptop or notebook computer 102*c*. The computing devices 102*a*, 102*b*, 102*c* may be accessed by the user in various locations such as at home, at a store, at work, at an airport, or any other similar location. A user may access a browser or similar user interface at one of the computing devices 102*a*, 102*b*, 102*c* to connect to a server 104 via a communications network 106. The server 104 may include a computer readable memory device containing instructions for performing a process of determining and recommending sizing information to the user in response to various user actions such as selecting an apparel item for sale and/or selecting an available size for an apparel item for sale. Examples of steps of this process are discussed in more detail in the description of FIGS. 2-5 below. Descriptions of the accompanying user interface elements as illustrated in FIGS. 6-8 are described throughout the discussion of FIGS. 2-5 as appropriate.

It should be noted that the following discussions are directed to footwear by way of example only. The ideas, processes and techniques as described herein are not intended to be limited to footwear, and are applicable to any apparel item having one or more measurements and dimensions related to the fit of the apparel item on a person wearing the apparel item.

Figure 2:
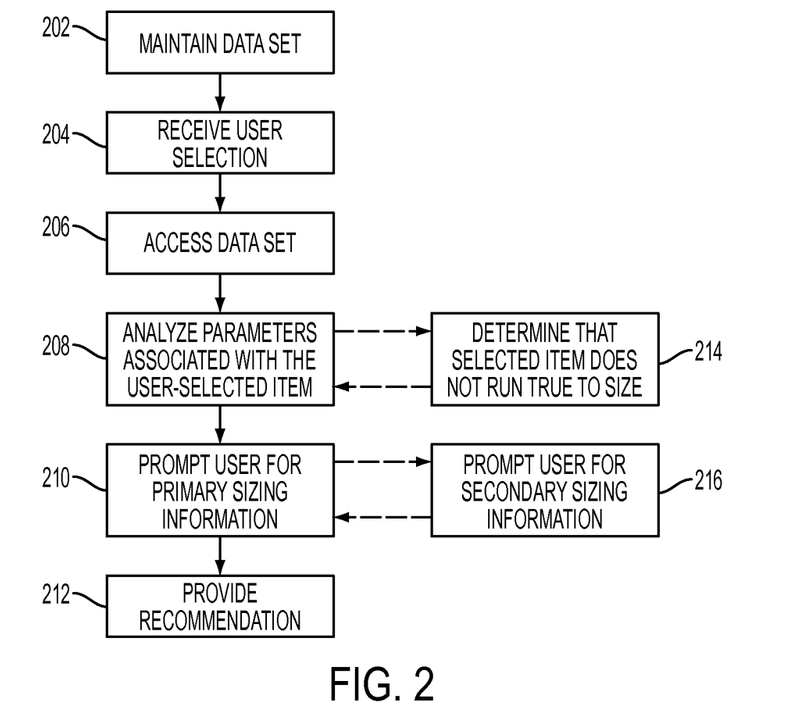
FIG. 2 illustrates a process for prompting a user to provide sizing information and providing a size recommendation according to an embodiment.

FIG. 2 illustrates a sample process for providing a sizing recommendation for wearable items such as footwear. A computing device, such as server 104 as described above, or one of computing devices 102*a*, 102*b* or 102*c*, can maintain 202 a data set including a plurality of wearable items and data related to each wearable item. The data set can include a set of internal measurements and other parameters that may be obtained for each wearable item and imported into the data set such that a two or three dimensional (3D) representation of the wearable item may be constructed.

For example, for a footwear model, the internal measurements of the footwear model can include a total length measurement, a total width measurement, heel width, arch length and arch width. When applicable, additional measurement parameters can also be stored, including, but not limited to, toe box height, forefoot height, and arch height. Three dimensional measurements may be stored within the data set as well, such as toe box girth, forefoot girth, and heel to toe girth. Measurement parameters such as tapering or change in width as a percentage of total length can also be stored within the data set. It should be noted that this list of measurements and related parameters is provided by way of example only, and additional measurements and parameters may be included such as heel height, arch height, girth, foot opening diameter, and any other relevant information. All of these parameters may be collected and stored in a data set is associated with an identifier for the footwear model.

Additional measurements and parameters may be associated with a footwear model depending on model type. For example, a running shoe may have measurement parameters associated with stability, cushioning, motion control, racing spikes, and any other relevant measurement parameters. These parameters may be received by scanning the footwear model using a device such as that disclosed in U.S. Patent Application Publication No. US2012/0316827, the disclosure of which is fully incorporated into this document by reference. Alternatively or in addition, some information may be available from the manufacturer of the footwear. Depending on the information available, some additional measurement parameters may be assigned a numerical value representing the measurement parameter. For example, an expensive running shoe may have a high level of cushioning. The measurement parameter for cushioning may be set to "high" or a similar numerical value representing a high level of cushioning in the data set. Alternatively, an additional measurement parameter may be assigned merely a binary value representing a true/false or yes/no value, indicating whether the footwear model has this additional measurement parameter. For example, a running shoe having racing spikes may only list "yes" as the value for the racing spikes measurement parameter in the data store.

In addition, the parameters may include additional parameters that are specific to one or more particular retailers that will sell the footwear model. For example, information related to consumer ratings of a retailer can be stored in the data set. Similarly, information such as return or replacement numbers and reasons for return can be stored in the data set to provide additional information related to a particular wearable item.

By implementing programming instructions, the computing device may cause a display of the device to implement a user interface by which a user may enter, and the device may receive 204, a user selection of an item to purchase. The computing device may be part of a system that may provide a website or similar user interface that the user may access via a remote computing device, and the user may utilize the user interface to select the item to purchase, as well as to view and/or select additional information related to the item such as color and style. Various input features may be provided in the user interface such as text fields, drop down menus, or other input devices to aid in the user during selection. The user may select a size of the item, or the computing device may select an initially recommended size using systems such as those described in related U.S. Pat. No. 8,521,616, the disclosure of which is fully incorporated into this document by reference.

The computing device can access 206 the data set to retrieve the stored information related to the user-selected item, and analyze 208 the stored measurements and parameters associated with the user-selected item. The computing device can also prompt 210 the user to provide sizing information. For example, as shown in FIG. 6A, a screenshot of a user interface element 600 shows a sample user interface 602 for prompting 210 the user to provide primary sizing information. Specifically, as shown in FIG. 6A, the system prompts the user to provide the size they typically wear in a running shoe. Alternatively, the system may retrieve the user's size from information previously provided by the user, such as a user profile or previous purchase data. Based upon the user-provided primary sizing information, the system may determine a recommended size of the user-selected item and provide 212 the recommendation. FIG. 7 illustrates a sample screenshot of a user interface element 700 including a recommendation 702 to the user of a specific size of footwear to purchase.

Optionally, the process as shown in FIG. 2 may include various other programming features and process steps. For example, during analysis 208 the computing device may also determine 214 whether the user-selected item runs true to size. As used in this document, the terms "true to fit," "true to size," "true to standard size," and similar phrases (sometimes simply referred to as "true" for short) refer to an assessment of whether the internal measurements of the selected item of the selected size are substantially similar to those of a set of measurements for a standard (i.e., reference) size. The system may make this determination by comparing the stored measurements and parameters for the user-selected item to standard information related to standard sizes, and determining whether one or more of the compared parameters differ from the standard size by more than a threshold amount. For example, for footwear, internal measurements such as length and width for the user-selected item (e.g., a size 12 running shoe) can be compared to standard internal measurements for an industry standard running shoe. To determine the industry standards, the computing device may compute an overall average, mean or composite size or model for all models in that particular size (e.g., an overall average of all internal measurements of all size 12 shoes). Alternatively, the system may determine a standard size based on one or more subsets or categories within the applicable industry rather than an overall industry standard. For example, the category may be a shoe type or a manufacturer. If so, the a standard size may be determined by determining an average, mean or composite size or model for a group of shoes of a particular type (e.g., running, basketball, soccer, hiking, dress, pump, etc.), of a particular manufacturer, or based on a combination of categories As an additional alternative, the industry standard size may be set by a manufacturer, a group of manufacturers, a supplier or group of suppliers, a retailer or a group or retailers, or other similar groups.

During determination 214, the system may also consider one or more structural features of the item that affect how an item fits to determine if the item is true to standard size. For example, a high heel shoe may include one or more straps that cross the top of a wearer's foot and attach at various points on the sides of the shoe. When worn, one or more of the straps can cause the shoe to fit differently on the wearer's foot, thereby altering the fit and comfort of the shoe. Such a feature, including various structural and decorative features integrated onto an item, that results in possible deviation from a user's selected size of that item can also be considered when determining 214 whether the user-selected item runs true to size. As an example, a shoe that has straps may have girths, height, length or width measurements or material properties that differ by a critical threshold level from the measurements of a shopper's shoe or shoes, or from the "true to size" average in that brand or similar type of shoes in an equivalent area or feature of the shoe. In this way, the system may analyze data for specific measurements and material properties of a variety of wearable items (or for a variety of units of a particular item sold), compare that data with sales data and/or consumer ratings data for the item(s), and determine whether a given area or feature of a shoe may have a high correlation with returns or does not match the shopper's fitting preference. Furthermore, system may allow the shopper to enter data that directly identifies the area of the shoe that does not fit well. The system may compare physical measurements of this area with those of a reference shoe to determine whether or not this feature is an outlier and whether shoes with similar features will also not fit well. This system can then use this deviation to make size and product recommendations.

Additionally, in the process as shown in FIG. 2, the computing device can also execute programming instructions that cause it or a local computing device to prompt 216 the user for secondary sizing information. For example, secondary sizing information may include what size the user is most likely to wear if their primary size does not fit properly. FIG. 6B provides a sample screenshot of a user interface element 610 illustrating a user interface 612 for prompting 216 the user for secondary sizing information. As shown in FIG. 6B, the secondary sizing information may be related to an alternative size the user wears when they do not wear their primary size. The computing device may use the secondary sizing information to provide 212 a more accurate size recommendation for the user.

Figure 3:
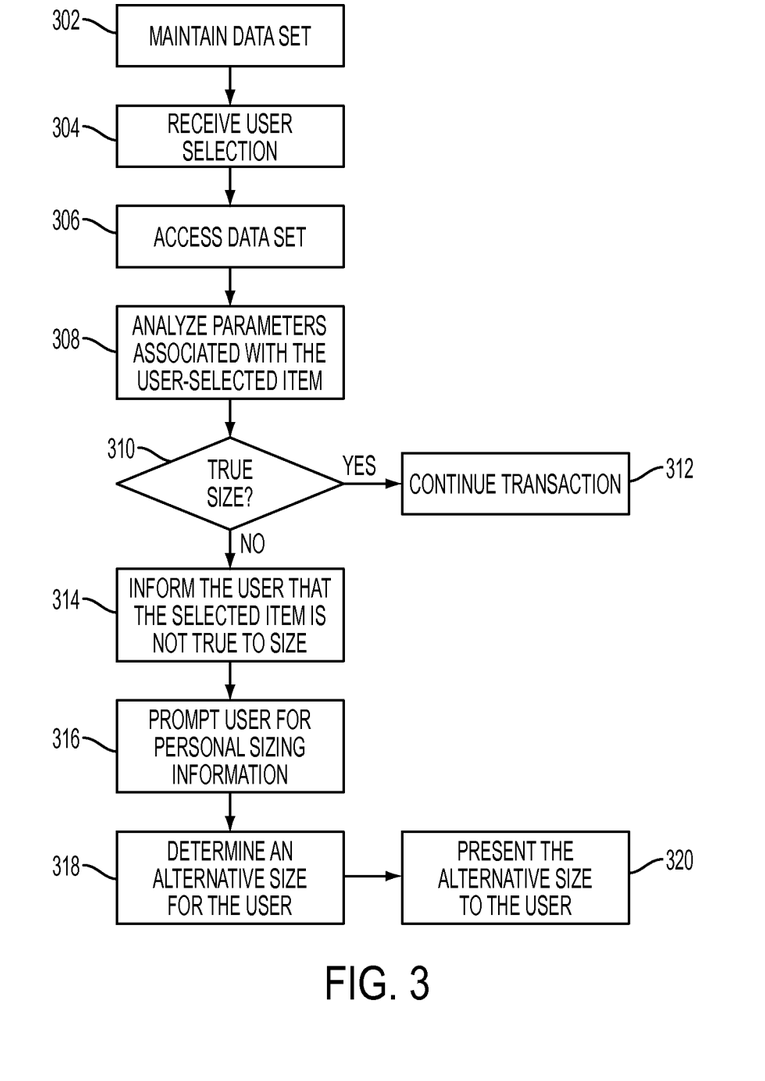
FIG. 3 illustrates a process for determining whether a selected item runs true to size and providing a size recommendation to a user according to an embodiment.

FIG. 3 illustrates a sample process for providing a sizing recommendation for wearable items such as footwear based upon whether the wearable time runs true to size. A computing device, such as server 104 as described above, maintains 302 a data set including a plurality of wearable items and data related to each wearable item. As noted above in the discussion of FIG. 2, the data set can include various measurements and parameters related to each of the wearable items.

The computing device may receive 304 a user selection of an item to purchase, along with specific sizing information for the item. The computing device can access 306 the data set to retrieve the stored information related to the user-selected item, and analyze 308 the stored measurements and parameters associated with the user-selected item. In particular, the computing device can analyze 308 the parameters and determine 310 whether the user-selected item runs true to size. As noted above, the system may do this by accessing the data set, retrieving a set of stored measurements and other parameters for the user-selected item, retrieving a set of stored measurements and other parameters for a standard size, and comparing the values of each measurement and other parameter in the two sets. If the comparison indicates that the measurements are substantially similar, then the system may determine that the item runs true to size. If not, then the system may determine what that item does not run true to size. Any suitable algorithm may be used for the determination, such as a requirement that no pair of values for any particular parameter be greater than a threshold level of difference from each other. The difference may be set as a percentage, and actual value, or another unit of measure. The system may assign different thresholds to different measurements or parameters, such that certain parameters (such as internal width of the toe box of a shoe) having smaller thresholds than other parameters that may be less important to a truth of size analysis (such as resilience of the insole).

If the computing device does determine 310 that the user-selected item runs true to size, the computing device can continue 312 the transaction based upon the user-selected size for the item. For example, if the computing device determines 310 that a size 12 in the user-selected shoe runs true to the standard size 12, the computing device may continue 312 the transaction by generating and outputting a recommendation that the user purchase the item, or simply accepting and implementing a user's request to purchase the item.

Conversely, if the computing device determines 310 that the user-selected item does not run true in size, the computing device may inform 314 the user that the item does not run true to size. For example, a user interface being utilized by the user to select the item may be update to inform 314 the user that the item does not run true to size. FIG. 8 shows a sample screenshot of a user interface element 800, including a notice 802 that the user selected item does not run true to size, and recommends the user get a size recommendation.

The computing device may prompt 316 the user to provide personal sizing information. For example, as discussed above, the user may be prompted for both primary and secondary sizing information. In that example, the primary size would be a size 12, and the secondary sizing information would be that the user, when not wearing a size 12, typically wears a size that is smaller than a size 12. Based upon the personal sizing information, the computing device may determine 318 an alternative size for the user, and present 320 the alternative size recommendation to the user as, for example, a screenshot element such as that shown in FIG. 8. Additional information related to the determination of an alternate size is provided in the discussion of FIG. 5 below.

Figure 4:
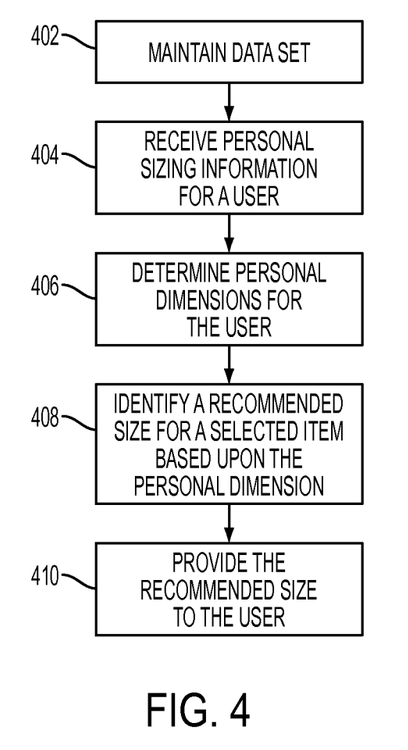
FIG. 4 illustrates a process for providing a size recommendation to a user based upon determined personal dimensions for the user according to an embodiment.

FIG. 4 illustrates a sample process for providing a sizing recommendation for wearable items such as footwear based upon personalized sizing information received from a user. As used in this document, the terms "personal fit information," "personalized sizing information" and "personal sizing information" refer to one or more reference apparel sizes that a user provides to a system for use in making future recommendations. This will be described in more detail below. The process as described in FIG. 4 may be applied to additional processes such as those shown in FIGS. 2 and 3 to improve recommendations.

A computing device, such as server 104 or a local computing device such as 102*a*, 102*b* or 102*c* as described above, maintains 402 a data set including a plurality of wearable items and data related to each wearable item. As noted above in the discussion of FIG. 2, the data set can include various measurements and parameters related to each of the wearable items.

The computing device may receive 404 personal sizing information related to a specific user. For example, the personal sizing information may include a primary footwear size, which represents the size of shoe that the user wears most often, and a secondary footwear size that represents the user's second most commonly-worn size. Based upon the received 404 personal sizing information, the computing device may determine personal dimensions specific to that user. For example, the user may be prompted to input their primary footwear size, as well as their secondary footwear sizing information. The user may input that their primary footwear size is a 12, and that their secondary footwear sizing information is that they typically wear a size smaller than a 12 when not wearing a 12, i.e., when not wearing their primary size. Based upon this information, the computing device may determine 406 that, for this particular user, their personal dimensions are similar to a size 11.8, or slightly smaller than their primary size. Conversely, if the user indicated that they typically wear larger than a 12 for their secondary sizing information, the computing device may determine 406 that their personal dimensions are similar to a size 12.2, or slightly larger than their primary size.

The computing device can determine the personal dimension information by establishing a set of internal measurements based upon the determined personal dimensions. To continue the above example, the computing device may determine 406 that a user has a personal size of about 11.8. The computing device may establish a graph or other similar representation of all footwear that have sizing information stored in the data set, plotting each size against each internal measurement for each individual piece of footwear. The computing device may then fit a best fit line into the data, providing a reference for each measurement as it compares to each footwear size. The computing device can then look up the user's personal size, e.g., 11.8, on the graph for each measurement to determine a set of personalized internal measurements for that user.

Based upon the user's personal dimensions, the computing device may identify 408 a recommended size for a user-selected item, and provide 410 the recommended size to the user. To continue the above example, if the computing device determines 406 that a user's personal dimensions are similar to a size 11.8, the computing device may identify 408 a size 12 for a shoe that runs true to size. Alternatively, for a shoe that runs larger than true size, the computing device may identify 408 a size 11.5 for the user.

Figure 5:
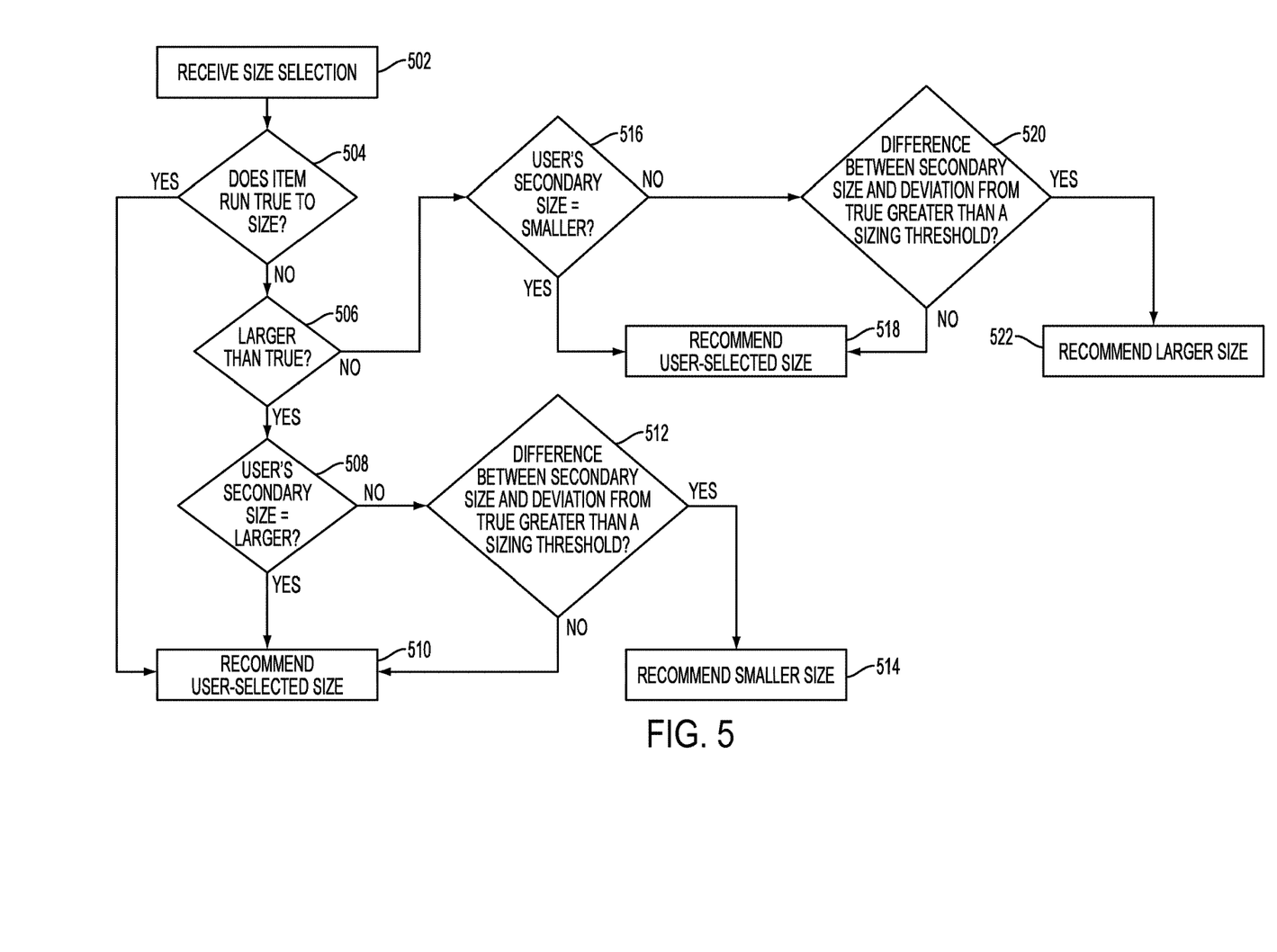
FIG. 5 illustrates a process for providing a recommended size to a user for a wearable item that does not run true to size according to an embodiment.

FIG. 5 illustrates a sample process for determining and recommending a size for a user when a wearable item does not run true to size. Such a sizing determination and recommendation process as that shown in FIG. 5 can be used in conjunction with the processes as described in FIGS. 3 and 4.

The computing device or size recommendation system may receive 502 a size selection and determine 504 whether the user-selected item runs true to size. If the computing device does determine 504 that the user-selected item runs true to size, the recommendation system may recommend 510 the user-selected size for the selected item.

Conversely, if the computing device determines 504 that the user-selected item does not run true to size, the computing device may determine 506 whether the user-selected item runs larger than true. To make this determination, the computing device may compare one or more internal measurements and/or parameters related to the user-selected item against one or more internal measurements and/or parameters for a standard sized item.

If the computing device determines 506 that the user-selected item runs larger than true, the computing device may determine 508 whether the user's secondary size is larger than their primary sizing information. If the user's secondary sizing information is larger than their primary sizing information, the recommendation system may recommend 510 the user selected size to the user. In this example, as the user-selected item tends to run larger than true and the user provided that their secondary sizing information is typically larger than their primary sizing information, the recommendation system may determine that the initial user-selected size is most likely the best fit.

Alternatively, if the user's secondary size is not larger than their primary sizing information, the computing device may determine 512 whether a difference between the user's secondary sizing information and the deviation from true for the user-selected item is greater than a specific sizing threshold. The sizing threshold may be selected as a standard measurement for all items. For example, the threshold may be set at 0.25 inches. Alternatively, the sizing threshold may be selected as a portion of the total length of the selected item. For example, for a footwear item, the threshold may be set as 2.5% of the total length of the select item.

If the computing device determines 512 that the difference is greater than the sizing threshold, the recommendation system may recommend 514 a smaller size to the user. Conversely, if the computing device determines 512 that the difference is less than the sizing threshold, the recommendation system may recommend 510 the user-selected size.

If the computing device determines 506 that the user-selected item runs smaller than true, the computing device may determine 516 whether the user's secondary size is smaller than their primary sizing information. If the user's secondary sizing information is smaller than their primary sizing information, the recommendation system may recommend 518 the user selected size to the user. In this example, as the user-selected item tends to run smaller than true and the user provided that their secondary sizing information is typically smaller than their primary sizing information, the recommendation system may determine that the initial user-selected size is most likely the best fit.

Alternatively, if the user's secondary size is not smaller than their primary sizing information, the computing device may determine 520 whether a difference between the user's secondary sizing information and the deviation from true for the user-selected item is greater than a specific sizing threshold. If the computing device determines 520 that the difference is greater than the sizing threshold, the recommendation system may recommend 522 a larger size to the user. Conversely, if the computing device determines 522 that the difference is less than the sizing threshold, the recommendation system may recommend 518 the user-selected size.

As noted above, the processes and related examples as discussed with respect to FIGS. 2-5 and the screenshots and user interfaces illustrated in FIGS. 6-8 are directed to footwear by way of example only. The processes and techniques as described in the present disclosure can be applied to all wearable items, beyond those specific examples included herein. For example, when determining whether an item of a size runs true to fit (step 504 of FIG. 5), instead of directly comparing the parameters for the selected size of the selected item to those of the standard item in the selected size, the system may indirectly perform the comparison by using one or more intermediate comparison steps. For example, the system may the user's primary typical size and the secondary typical size to determine a set of personal dimension values for a body part of the user. The body part is that on which the selected wearable item is designed to be worn (e.g., a foot for a shoe, a hand for a glove, etc.). The system may determine these values in any suitable manner. For example, the system may identify the reference (standard) size of the selected item having the most parameter values that are between the corresponding parameter values of the user's primary size and secondary size, then use the parameter values of the identified standard size as the personal dimension values for the user's body part. Other processes are possible. The system may then developing a recommendation comprising the identified size of the wearable item that corresponds to the user's dimensions (such as the identified standard size), and cause a user interface to output the recommendation to the user.

When determining a recommended size for the selected wearable item, the system also may consider whether additional parameters for a potentially-recommended size of the wearable item, such return data or consumer rating data, indicates that a potential size of the selected wearable item does not run true to fit. The system may only select the potential size as the recommended size if the it does not conclude that the return data or consumer rating data indicates that the potential size of the selected wearable item does not run true to fit. For example, if a particular size of a selected item has higher than a threshold level of return data, or lower than a threshold consumer rating level, then the system may conclude that the item of that size does not run true to fit. If so, it may select an alternate size to recommend to the user, or it may inform the user that no likely size runs true to size.

Figure 9:
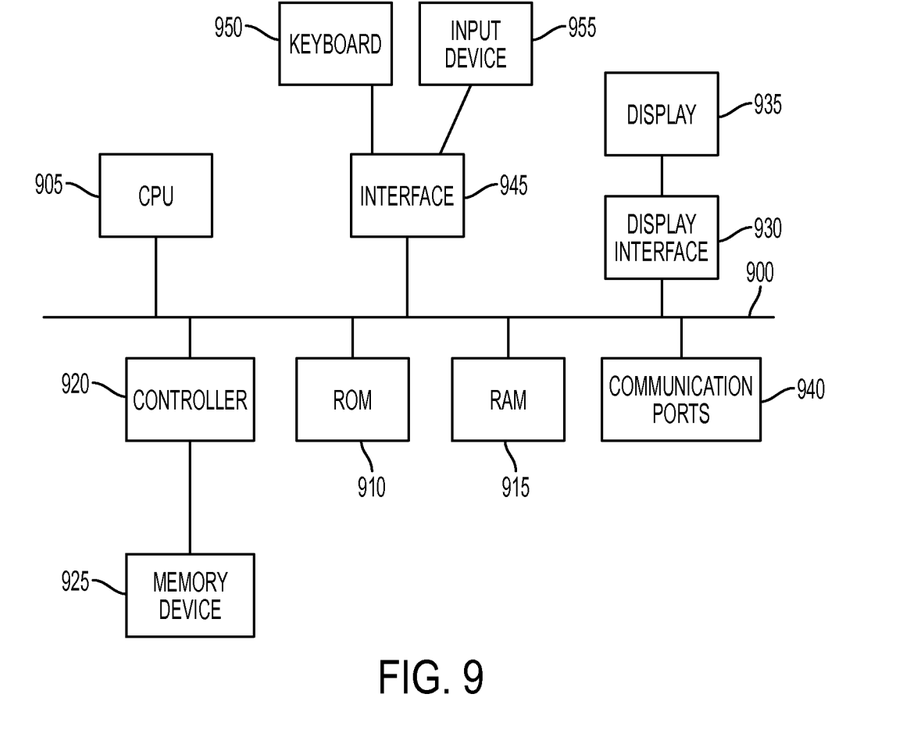
FIG. 9 illustrates various embodiments of a computing device for implementing various methods and processes described herein.

FIG. 9 depicts an example of internal hardware that may be used to contain or implement the various computer processes and systems as discussed above. An electrical bus 900 serves as an information highway interconnecting the other illustrated components of the hardware. A computing device will include one or more processors. CPU 905 is a central processing unit of the system, performing calculations and logic operations required to execute a program. CPU 905, alone or in conjunction with one or more of the other elements disclosed in FIG. 9, is a processing device, computing device or processor as such terms are used within this disclosure. When used in this document, unless the context specifically indicates otherwise, the term "processor" refers to a hardware that operates as a processing device, or two or more processing devices that together perform a set of functions. Read only memory (ROM) 910 and random access memory (RAM) 915 constitute examples of memory devices.

A controller 920 interfaces with one or more optional memory devices 925 that service as data storage facilities to the system bus 900. These memory devices 925 may include, for example, an external DVD drive or CD ROM drive, a hard drive, flash memory, a USB drive, a distributed storage medium such as a cloud-based architecture, or another type of device that serves as a data storage facility. As indicated previously, these various drives and controllers are optional devices. Additionally, the memory devices 925 may be configured to include individual files for storing any software modules or instructions, auxiliary data, incident data, common files for storing groups of contingency tables and/or regression models, or one or more databases for storing the information as discussed above.

Program instructions, software or interactive modules for performing any of the functional steps associated with the processes as described above may be stored in the ROM 910 and/or the RAM 915. Optionally, the program instructions may be stored on a tangible computer readable medium such as a compact disk, a digital disk, flash memory, a memory card, a USB drive, an optical disc storage medium, a distributed storage medium such as a cloud-based architecture, and/or other recording medium.

A display interface 930 may permit information from the bus 900 to be displayed on the display 935 in audio, visual, graphic or alphanumeric format. Communication with external devices may occur using various communication ports 940. A communication port 940 may be attached to a communications network, such as the Internet, a local area network or a cellular telephone data network.

The hardware may also include an interface 945 which allows for receipt of data from input devices such as a keyboard 950 or other input device 955 such as a remote control, a pointing device, a video input device and/or an audio input device.

The features and functions discussed above, as well as alternatives, may be combined into many other different systems or applications. Various presently unforeseen or unanticipated alternatives, modifications, variations or improvements may be made by those skilled in the art, each of which is also intended to be encompassed by the disclosed embodiments.

The invention claimed is:

1. A computer-implemented method comprising:
maintaining, in a data storage facility, a data set comprising data regarding a plurality of models of a wearable item, in which the data for each model comprises a size and, for each size, parameters relating to fit;
by a processor, causing an electronic device to generate and output an interactive user interface including a first region comprising a selector by which a user may select a model from the data set and a second region comprising a size comparator;
by the selector on the interactive user interface of the electronic device, receiving a first user selection of a selected model of the plurality of models and a preferred size for the selected model;
by the processor, accessing the data set to retrieve the parameters for the selected model in the preferred size;
determining whether the selected model in the preferred size runs true to fit by comparing values for the parameters for the selected model in the preferred size to average values of the parameters for at least some of the plurality of models in the preferred size;
at least in part in response to the first user selection, causing, by the processor, the electronic device to update the size comparator on the interactive user interface to display results of the comparing including whether the selected model in the preferred size runs true to fit; and
at least in part in response to the causing display on the interactive user interface of the selected model in the preferred size not running true to fit, receiving a second user selection on the interactive user interface to purchase an alternative size for the selected model different from the preferred size.

2. The method of claim 1, further comprising, by the processor after determining that the selected model in the preferred size does not run true to fit:
identifying the alternative size for the selected model;
generating a recommendation that the user select the alternative size of the selected model; and
causing the electronic device to update the size comparator on the interactive user interface to output the recommendation to the user.

3. The method of claim 1, wherein:
the parameters for each model comprise internal measurement information for the model; and
the method further comprises:
by the interactive user interface of the electronic device, prompting the user to enter personal fit information comprising a primary size and a secondary size,
receiving the personal fit information via the selector on the interactive user interface,
by the processor, using the personal fit information, internal measurement information for the preferred size of the selected model, and internal measurement information for at least the alternative size of the selected model to determine a recommended size for the selected model, and
at least in part in response to the first user selection, causing the electronic device to update the size comparator on the interactive user interface to present the alternative size as the recommended size to the user.

4. The method of claim 2, wherein:
the parameters comprise:
internal measurement data, and
return data or consumer rating data; and
identifying the alternative size for the selected model also comprises determining whether the return data or consumer rating data indicates that a potential size of the selected model does not run true to fit, and selecting the potential size as the alternative size unless the return data or consumer rating data indicates that the potential size of the selected model does not run true to fit.

5. A computer-implemented method comprising:
maintaining, in a data storage facility, a data set comprising data regarding a plurality of models of a wearable item, wherein:
the data for each model comprises a size and, for each size, one or more additional parameters, and
the one or more additional parameters for each size comprise internal measurement data;
by a processor:
causing a display of an interactive user interface comprising a selector and size comparator;
receiving, from a user via the selector on the interactive user interface, a first selection of a selected model of the plurality of models and a preferred size for the selected model,
comparing values for the one or more additional parameters for the selected model in the preferred size with average values of the one or more additional parameters for others of the plurality of models in the preferred size,
determining from the comparing that the selected model in the preferred size does not run true to a standard size,
receiving via the interactive user interface a primary typical size and a secondary typical size from the user, using the primary typical size, the secondary typical size, the internal measurement data for the preferred size of the selected model, and internal measurement data for at least one alternative size of the selected model to determine a recommended size for the selected model, at least in part in response to the first selection, causing the display to update the size comparator on the interactive user interface to display results of the comparing including whether the selected model in the preferred size runs true to the standard size, and at least in part in response to the causing the display on the interactive user interface of the selected model in the preferred size not running true to the standard size, receiving a second selection on the interactive user interface to purchase the alternative size for the selected model.

6. The method of claim 5, wherein:
the one or more additional parameters also comprise return data or consumer rating data; and
determining the recommended size for the selected model also comprises determining whether the return data or consumer rating data indicates that a potential size of the selected model does not run true to the standard size, and selecting the potential size as the recommended size unless the return data or consumer rating data indicates that the potential size of the selected model does not run true to the standard size.

7. The method of claim 5, wherein determining from the comparing that the selected model in the preferred size does not run true to size comprises:
determining that a difference between the values for the one or more additional parameters of the selected model in the preferred size and the average values of the one or more additional parameters for others of the plurality of models in the preferred size exceeds a threshold amount.

8. The method of claim 7, wherein determining the difference comprises determining that at least a threshold number of the one or more additional parameters of the selected model in the preferred size exceeds the corresponding one or more additional parameters of the standard size by the threshold amount.

9. The method of claim 5, wherein using the primary typical size, the secondary typical size, the internal measurement data for the preferred size of the selected model, and the internal measurement data for at least one alternative size of the selected model to determine a recommended size for the selected model comprises:
using the primary typical size and the secondary typical size to determine a plurality of personal dimension values for a body part of the user, wherein the body part is that on which the selected model is designed to be worn; and
identifying the recommended size as the selected model that has internal dimension values that most closely fit the determined personal dimension values of the user.

10. A wearable item size recommendation system, comprising:
a data storage facility comprising one or more memory devices that store a data set comprising data regarding a plurality of models of a wearable item, wherein:
the data for each model comprises a size and, for each size, one or more additional parameters, and
the one or more additional parameters for each size comprise internal measurement data;
a processing device; and a non-transitory computer-readable medium containing programming instructions that are configured to instruct the processing device to:
cause a display of an interactive user interface comprising a selector and a size comparator;
receive, from a user via the selector on the interactive user interface, a first selection of a selected model of the plurality of models and a preferred size for the selected model,
compare values for the one or more additional parameters for the selected model in the preferred size with average values of the one or more additional parameters for others of the plurality of models in the preferred size,
determine from the comparing that the selected model in the preferred size does not run true to a standard size,
receive via the interactive user interface a primary typical size and a secondary typical size from the user,
use the primary typical size, the secondary typical size, the internal measurement data for the preferred size of the selected model, and internal measurement data for at least one alternative size of the selected model to determine a recommended size for the selected model,
at least in part in response to the first selection, cause the display to update the size comparator on the interactive user interface to display results of the comparing including whether the selected model in the preferred size runs true to the standard size, and
at least in part in response to the causing the display on the interactive user interface of the selected model in the preferred size not running true to the standard size, receive a second selection on the interactive user interface to purchase the alternative size for the selected model.

11. The system of claim 10, wherein:
the one or more additional parameters also comprise return data or consumer rating data; and
the programming instructions are further configured to instruct the processing device to determine a recommended size for the model are also configured to cause the processing device to determine whether the return data or consumer rating data indicates that a potential size of the selected model does not run true to the standard size, and select the potential size as the recommended size unless the return data or consumer rating data indicates that the potential size of the selected model does not run true to fit.

12. The system of claim 10, wherein the instructions that are configured to cause the processing device to determine from the comparing that the selected item in the preferred size does not run true to size comprise instructions to:
determine that a difference between the values for the one or more additional parameters of the selected model in the preferred size and the average values of the one or more additional parameters for others of the plurality of models in the preferred size exceeds a threshold amount.

13. The system of claim 12, wherein the instructions that cause the processing device to determine the difference comprise instructions to determine that at least a threshold number of the one or more additional parameters of the selected model in the preferred size exceed the corresponding one or more additional parameters of the standard size by the threshold amount.

14. The method of claim 1, wherein the updating the size comparator on the interactive user interface includes displaying a multi-dimensional representation of the selected model with the values for the parameters in the preferred size and of the selected model with the average values of the parameters in the preferred size.

15. The method of claim 5, wherein the updating the size comparator on the interactive user interface includes displaying a multi-dimensional representation of the selected model with the values for the parameters in the preferred size and of the selected model with the average values of the parameters in the preferred size.

16. The system of claim 10, wherein the causing the display to update the size comparator on the interactive user interface includes to display a multi-dimensional representation of the selected model with the values for the parameters in the preferred size and of the selected model with the average values of the parameters in the preferred size.

\* \* \* \* \*